United States Patent [19]
Minovitch

[11] 3,954,064
[45] May 4, 1976

[54] RAPID TRANSIT SYSTEM
[75] Inventor: Michael A. Minovitch, Los Angeles, Calif.
[73] Assignee: Gravity Transit Company, Los Angeles, Calif.
[22] Filed: May 3, 1974
[21] Appl. No.: 466,609

Related U.S. Application Data
[63] Continuation-in-part of Ser. No. 438,230, Jan. 31, 1974.

[52] U.S. Cl............................. 104/138 R; 104/130; 104/148 LM; 104/148 MS
[51] Int. Cl.² ......................................... B61B 13/10
[58] Field of Search ...... 104/138 R, 148 R, 148 MS, 104/148 SS, 155, 156, 148 LM, 130, ; 105/365; 138/106; 310/67 R; 280/217; 74/572; 356/153, 172

[56] References Cited
UNITED STATES PATENTS

| | | | |
|---|---|---|---|
| 432,615 | 7/1890 | Henning............................ | 104/138 R |
| 891,416 | 6/1908 | Fenyo.......................... | 104/138 R X |
| 2,118,590 | 5/1938 | Chilton................................ | 74/572 |
| 2,488,287 | 11/1949 | Goddard....................... | 104/138 R X |
| 3,593,668 | 7/1971 | Adams................................. | 104/130 |
| 3,603,688 | 9/1971 | Smith-Vaniz.................... | 356/153 X |
| 3,656,436 | 4/1972 | Edwards........................... | 104/138 R |
| 3,736,881 | 6/1973 | Lorinet....................... | 104/148 LM |
| 3,771,033 | 11/1973 | Matsui et al................ | 104/148 R X |
| 3,780,668 | 12/1973 | Schwarzler et al............ | 104/148 MS |
| 3,791,309 | 2/1974 | Baermann...................... | 104/148 MS |
| 3,845,720 | 11/1974 | Bohn et al..................... | 104/148 MS |
| 3,885,504 | 5/1975 | Baermann...................... | 104/148 MS |

OTHER PUBLICATIONS
"A Flywheel in Your Future", Newsweek, Feb. 11, 1974, pp. 98.

Primary Examiner—Albert J. Makay
Assistant Examiner—Randolph A. Reese
Attorney, Agent, or Firm—Christie, Parker & Hale

[57] ABSTRACT

A rapid transit system in which a vehicle, typically comprising a train of detachably coupled cars, is suspended in an underground vacuum tunnel by permanent magnetic rails of high coercivity and propelled by gravity. For closely spaced stations, such as in urban areas, the connecting tunnel paths are smooth continuous curves, lying essentially in the vertical planes connecting adjacent stations. For widely separated stations, such as in inter-city transit systems, the tunnel paths have horizontal reaches at their maximum depth, joined at the ends by smooth paths which arc up towards each station. The magnetic suspension and the vacuum environment enables the vehicle to move frictionlessly at high speeds without contacting the rails or any other part of the tunnel. Gravity propulsion from one station to the next is accomplished by allowing the vehicle to move frictionlessly down the decending arc of the tunnel, during which time it is accelerated by gravity, and decelerating by gravitational braking while moving along the tunnel's ascending arc. Thus, the trip is accomplished by transforming the vehicle's gravitational potential energy into kinetic energy and back into gravitational potential energy. Excess kinetic energy arising from moving between stations having different elevations is supplied or absorbed by onboard linear motor/generators that provide supplementary propulsion or regenerative braking. These linear motor/generators draw and return energy to on-board flywheel energy storage units. While moving along very long straight tunnel paths the vehicle's gravitational coasting speed is boosted by flywheel energy which is recovered by regenerative braking. Since the motion is essentially without friction and since the linear motor/generator-flywheel motor/alternator system can be designed with very high efficiencies, the principle of conservation of energy applies and very little input energy is required. In the ideal case, no input energy would be required since the vehicle's total energy remains constant even while moving between two stations at high speed. When the vehicle is at rest at stations having different elevations, the differences in its gravitational potential energy are balanced essentially by equal differences in its stored flywheel inertial energy. Except for a small amount of electrical energy expended for life support systems and to make up for losses due to energy conversion inefficiencies, no energy is used or required for the actual trips between stations.

32 Claims, 10 Drawing Figures

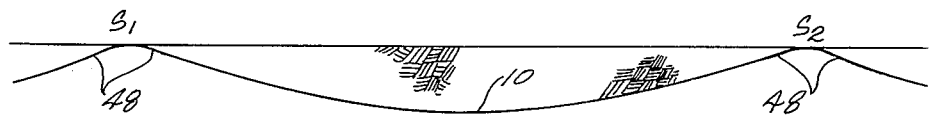
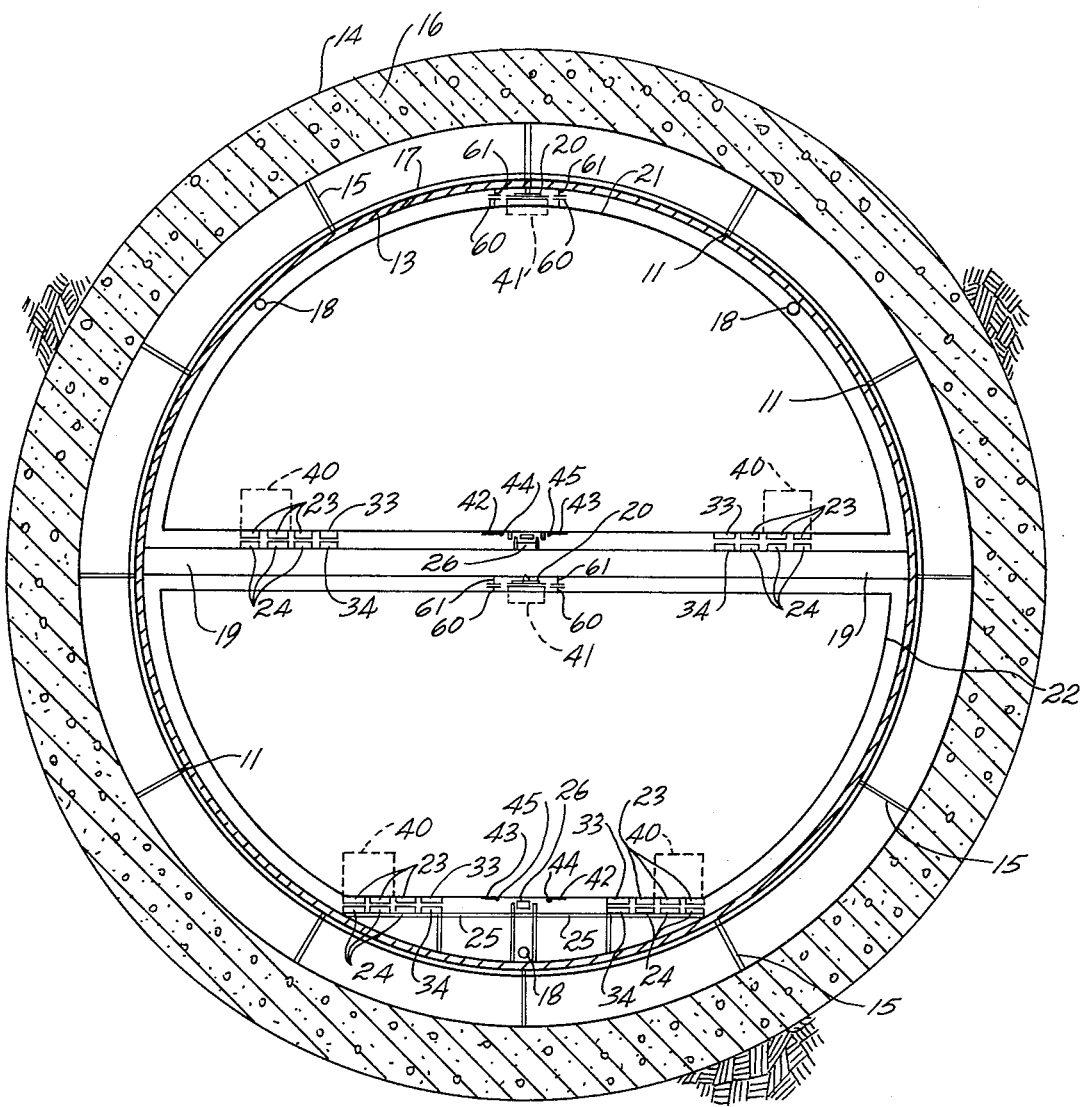

RAPID TRANSIT SYSTEM

This is a continuation-in-part of U.S. patent application Ser. No. 438,230, entitled RAPID TRANSIT SYSTEM, filed Jan. 31, 1974.

BACKGROUND

Since the beginning of this century, the total amount of energy consumed in the United States for all forms of transportation has been taking an increasing percentage of the total annual energy production. In 1970, for example, transportation consumed approximately 25% of the total energy produced for that year. If the present trends continue, transportation energy consumption will overtake the total industrial consumption during the early part of the 1980's and will become the single largest consumer of energy. There are two fundamental reasons for these trends: (1) the desire for faster transportation vehicles and (2) an increasing population. For all practical purposes, the amount of energy expended in propelling a vehicle is directly proportional to the square of its operating speed. But the desire for higher transportation speeds appears to take precedence over all other factors — thus producing and accelerating the high transportation energy consumption.

At first glance, it may appear that these facts rest upon basic physical laws that cannot be circumvented. For example, accelerating a vehicle along an essentially level highway or railway to reach high speeds requires a large amount of energy. This energy is usually totally expended when the vehicle is brought to a stop. However, instead of supplying this energy by large powerful on-board engines, as in conventional ground transportation systems, it is possible to remove them completely and utilize a vast energy resource that nature has placed at out disposal — namely gravity.

An object of this invention is to provide a gravity powered ground transportation system that is versatile and that will give very high operating speeds with very little energy consumption. This will be achieved by designing the vehicle so that it can move with almost zero friction in vacuum tunnels and therefore capable of converting potential energy into kinetic energy and vice versa through the principle of conservation of energy with almost no perceptible loss.

Before proceeding to a description of the invention it should be noted that gravity power and the process of transforming potential energy into kinetic energy is not new. In fact it is the source of water wheel power and more modern hydroelectric power. However, large machines that regularly transform potential energy into kinetic energy and vice versa have a more recent origin. Moveover, they have tended to emerge as machines of amusement rather than machines for practical work. The roller coaster is an excellent example. Unfortunately, rolling friction and air resistance give them rather low conversion efficiencies. There are many hybrid machines that utilize a combination of energy sources such as heat, potential and kinetic energies.

One interesting machine proposed by Edwards in U.S. Pat. No. 3,605,629, for ground transportation utilized pneumatic atmospheric pressure, potential and kinetic energies. See also his U.S. Pat. No. 3,601,158. The system involved vehicles propelled as a free piston through air tight tubes by a differential air pressure applied between the ends of the vehicle. Although an assist was supplied by gravity, the system was primarily designed around the pneumatic propulsion concept and required a great deal of large pneumatic support equipment such as compressors, valves, vents and very large air locks.

In every prior transit system large amounts of propulsive thrust are applied either within the vehicle, as by motors, or externally by pneumatic, or magnetic forces, or the classic cable cars of San Francisco.

Aside from the relatively inefficient and trivial roller coaster application of the principle of conservation of energy (potential and kinetic representations) there appears to be no previous attempt to utilize this principle as the fundamental propulsion means. The roller coaster quickly "runs down" and is clearly not suitable for a practical rapid transit system. Of course, the reason is quite obvious — frictionless motion could not be obtained. However, recent technological developments, particularly in the field of magnetic levitation, open the way for actually achieving motion without friction. This invention utilizes these developments to provide a rapid transit system that is based entirely on the principle of conservation of energy.

In my copending U.S. Pat. Application Ser. No. 438,230 entitled RAPID TRANSIT SYSTEM, filed Jan. 31, 1974, I show how an economical magnetically levitated rapid transit system can be designed to operate almost entirely on gravity power. The realization of the system, however, depends upon the attainment of drag-free levitation at high speeds. In the above mentioned patent application the suspension system is based upon ferromagnetic attraction using servo-controlled electromagnets assisted by superconducting magnets of constant field strength. Although this system can indeed provide very high lift to drag ratios if the ferromagnetic suspension and guide rails have high resistivity and are laminated, there are nevertheless some non-negligible drag that causes power losses which increase at higher speeds.

The rapid transit system disclosed in this application differs from the former in that the levitation system has zero magnetic drag at all speeds and does not consume energy. This is accomplished by utilizing magnetic forces of repulsion between like poles of permanent magnets. Thus, for example, by laying rails composed of permanent magnets with north poles facing up, a train fitted with other permanent magnets directly above the rails with north poles facing down, can be suspended by the resulting magnetic repulsion forces (see Polgreen's article, "Rail-Ways With a Magnetic Suspension," *The Engineer*, Oct. 25, 1968, pp. 632–636). Moreover, such a levitation system not only gives zero magnetic drag, but also requires zero energy to maintain this levitation. Hence, energy from on-board energy storage units that would otherwise be needed for vehicle levitation can be used to provide additional major vehicle propulsion that could be recovered by regenerative braking. An object of this invention is to provide an economical gravity/flywheel powered rapid transit system utilizing drag-free static repulsive fields of permanent magnets with high coercivity.

BRIEF SUMMARY OF THE INVENTION

Thus, in the practice of this invention according to a presently preferred embodiment there is provided a vehicle, typically comprising a train of detachably coupled cars, supported in a vacuum tunnel by repulsive magnetic forces from permanent magnets so that no part of the vehicle is in physical contact with the tunnel. The tunnels between stations are deep underground and follow gently curving arcs lying essentially in the vertical plane connecting adjacent stations. Acceleration leaving one station and deceleration approaching the other is achieved by allowing the vehicle to move along the decending arc where it is accelerated by gravity and by moving along the ascending arc where it is decelerated by gravity. Energy differences arising from moving between stations at different elevations are absorbed by on-board flywheel inertial energy storage units with linear motor/generators. When station separation distances are large, this system is also used to obtain higher coasting speeds. The nearly frictionless motion permitted by the permanent magnet suspension system and the vacuum tunnel allows the transformation between gravitational potential energy, flywheel inertial energy and vehicle kinetic energy to take place in either direction with very high efficiency. Since no energy is needed for levitation, the rapid transit system therefore approaches an operation where the physical principle of conservation of energy applies and virtually no energy is expended while the vehicles move from station to station.

An economical split-level tunnel design is provided to allow two vehicles to move simultaneously in opposite directions in the same tunnel section. A switching system is provided that enables versatile track lay-outs. The entire tunnel network system is pressure sealed and kept in a hard vacuum environment to eliminate aerodynamic drag and buffeting. This permits very close vehicle/tunnel clearance resulting in greater tunnel utilization and lower tunneling costs.

In a preferred embodiment the individual train cars have a double hull construction for pressurization. A system of several relatively small passenger air-locks are built into the tunnel walls at each station and are equally spaced so that when a train stops at a certain point, all its doors are opposite air-locks. The air-locks engage the car doors by flanges that are extended and inserted into air tight slots surrounding each car door.

DRAWINGS

These and other features and advantages of the present invention will be appreciated as the same becomes understood by reference to the following detailed description of a presently preferred embodiment when considered in connection with the accompanying drawings wherein:

FIG. 1 illustrates a vertical longitudinal cross-section of a representative underground tunnel path connecting two adjacent stations $S_1$ and $S_2$ at equal elevations;

FIG. 2 is a transverse cross-section of the outer tunnel and inner, split-level vacuum tunnel mounted inside and containing upper and lower level cars;

DESCRIPTION OF THE PREFERRED EMBODIMENT

Figure 3:
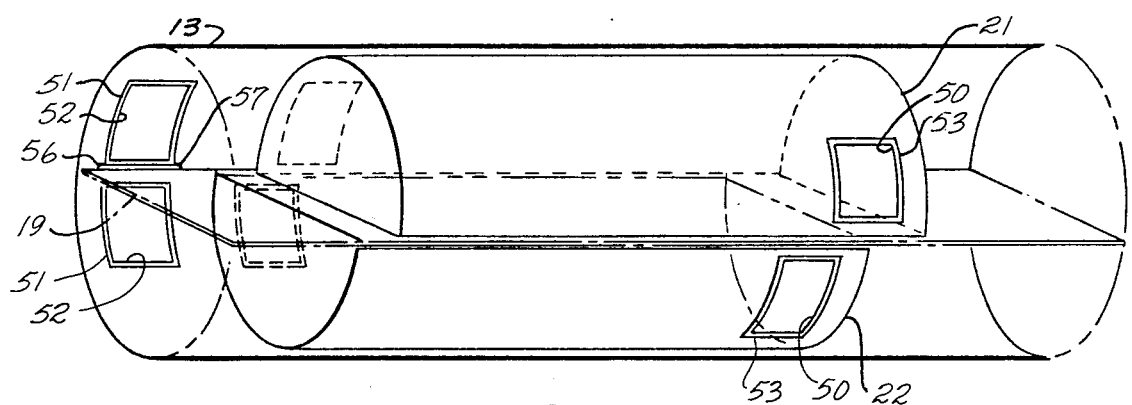
FIG. 3 is a schematic perspective view of the split-level tunnel design showing an upper level car and a lower level car.

A basic concept behind this invention (and in my aforementioned U.S. Patent Application) is the utilization of gravity to propel vehicles from one point to another. This is accomplished by providing the vehicles with a frictionless magnetic levitation system and allowing them to move frictionlessly inside a vacuum tunnel by converting their gravitational potential energy, relative to some gravitational equi-potential surface deep underground, into kinetic energy and back into potential energy. Thus, when travelling between stations having equal elevation, no propulsive energy is required or expended. Moreover, the passengers in a gravity propelled vehicle experience absolutely no forward or backward accelerations whatsoever. They experience only slight downward and upward accelerations perpendicular to the vehicles's floor equivalent to riding on a vertical elevator. These two fundamental characteristics enable the resulting system to outperform any prior art rapid transit system and probably all future surface rapid transit systems for urban areas. These profound aspects of the gravity propelled rapid transit system are demonstrated herein.

If y denotes the vertical depth below the station equipotential surface at any point in the tunnel and g the gravitational constant equal to 9.8 meters/sec$^2$ (32.16 feet/sec$^2$), the vehicle'gravitational speed (i.e., coasting speed) V is determined by $$V = \sqrt{2gy}$$

The tunnel path connecting two adjacent stations will lie in the vertical plane passing through the stations. The normal acceleration $a_n$ acting on the passengers perpendicular to the vehicle's floor (which is the only acceleration felt by them) is given by $$a_n = g \cos \theta + \frac{V^2}{R} = g \cos \theta + \frac{2gy}{R}$$

where $\theta$ and R denote the tunnel's inclination from the horizontal and radius of curvature respectively at the point in question (see, *Principles of Mechanics*, Mc Graw-Hill Book Co. 1949, pp. 118–125, by J. Synge and B. Griffith). The first and second terms appearing in the equation correspond to the component of gravity normal to the path and the centripetal acceleration due to its curvature respectively. If the path is a circular arc segment lying in the vertical plane containing the adjacent stations then the minimum acceleration $a_{min}$ and maximum acceleration $a_{max}$ are given by $$a_{min} = g \cos \theta_o$$

$$a_{max} = g + \frac{2gd}{R}$$

where $\theta_o$ denotes the tunnel's initial inclination. The maximum tunnel depth d is given by $$d = \frac{D}{2} \tan \frac{\theta_o}{2}$$

where D denotes the station separation distance. The trip time T is given by $$T = \pi \sqrt{\frac{D}{2g \sin \theta_o}} \left(1 + \frac{1}{4} \sin^2 \frac{\theta_o}{2}\right)$$

where terms of order 4 or higher are omitted (see, *Mechanics Heat Sound*, Addison-Wesley Press, Inc., 1952, p. 243 by F. Sears).

For a typical urban gravity powered rapid transit system with circular tunnel paths suppose $D = 4,000$ meters (2.5 miles) and $\theta_o = 20°$. Then the trip time $T = 77.32$ sec. Other parameters are $R = 5847.6$ meters (3.63 miles), $d = 352.7$ meters (1,157 feet), $V_{max} = 83.1$ meters/sec (186 mph), $a_{min} = .94g$ and $a_{max} = 1.12g$. (Circular tunnel paths were chosen on the basis of simplicity. In actual urban gravity propelled rapid transit systems the tunnel paths are optimized to give minimum trip times with acceptable accelerations. Thus, the trip time $T$ and the maximum acceleration $a_{max}$ given in the numerical example are slightly greater than they would be for an optimized system.)

As a comparison, suppose that the stations were connected by a linear, surface transportation system. The minimum acceleration and deceleration that would have to be developed by a vehicle in such a system in order to match the same 77.32 second trip time is .27g. The vehicle would accelerate at .27 g's until reaching the half-way point 2,000 meters (1.25 miles) when its speed would be 103.5 meters/sec (231.5 mph). It would then have to begin decelerating immediately at .27 g's in order not to over-run the next station. According to studies on high speed ground transportation systems for large urban communities where the passengers do not have to be strapped into their seats and can remain standing during peak passenger traffic periods, it was determined that the maximum tolerable acceleration (or deceleration) is about .15 g's. (See "A Parametric Model of High Speed Ground Transportation", *Transportation Research*, Vol. 3, pp. 317-331, 1969 by George Hoffman.) The minimum .27g acceleration determined above for the surface system is more than 80% greater than this maximum. This high acceleration and deceleration would topple over anyone standing in the vehicle's aisles or not restrained to their seats by seat belts. On the other hand, passengers in the gravity propelled vehicle experience absolutely no forward or backward acceleration whatsoever. The minimum and maximum accelerations experienced (i.e., variations from 1g) are .06g and .12g respectively and are perpendicular to the vehicle's floor. These are well within the toleration limits and are equivalent to a gentle ride in an elevator. In general, a surface vehicle would have to accelerate and decelerate at a minimum of $$a = \frac{8 \sin \theta_o}{\pi^2} g$$

in order to match the same trip time as the gravity propelled vehicle regardless of the separation distance $D$.

Thus, there are certain very important and fundamental reasons why a high speed surface transportation system will always remain inferior to a gravity propelled magnetically levitated system regardless of how sophisticated its energy generating system is or no matter how cheap and plentiful energy may become. Hence, we reach the remarkable conclusion that unless the basic physical laws of motion can be circumvented (which is highly unlikely) the gravity propelled magnetically levitated rapid transit system will always remain the fastest possible, general purpose urban rapid transit system where the passengers do not have to be strapped into their seats. (Of course, there will always be technical improvements in levitation systems but the simplicity of permanent magnetic levitation even makes these improvements unlikely.) Since essentially no energy is expended we reach an even more astonishing conclusion; a gravity propelled magnetically levitated rapid transit system for urban areas will not only offer the fastest possible transportation, but it will also consume the least amount of energy. FIG. 1 illustrates a typical tunnel path 10 (drawn to scale) connecting two adjacent stations $S_1$ and $S_2$ having separation distance $D = 4,000$ meters and lying in the vertical plane passing through the stations ($\theta_o = 20°, d = 352.7$ meters).

For situations involving significantly greater station-to-station separation distances D, the tunnel paths have straight horizontal reaches at their maximum depths. The total trip time $T$ is given approximately by the formula $$T = \frac{2}{g \sin \theta_o} \sqrt{2gd} + \frac{D \tan \theta_o - 2d}{\sqrt{2gd} \tan \theta_o}$$

where the maximum tunnel depth $d$ is an independent variable to be specified. For a typical example suppose $D = 60,000$ meters (37.3 miles), $\theta_o = 20°$ and $d = 1,000$ meters (3,281 feet). Then the maximum cruising speed $V_{max} = 140$ meters/sec (313 mph) and $T = 7.9$ minutes. The equivalent average surface speed is 126.9 meters/sec (284 mph). Essentially no energy is consumed in the gravity system and no horizontal accelerations are experienced. It is interesting to determine the fastest possible trip time $T_{min}$ that could be attained by gravity propelled vehicles traveling between two level stations with separation distance D without attempting to constrain the normal acceleration $a_n$. Omitting the analysis it can be shown that $$T_{min} = \sqrt{\frac{2\pi D}{g}}$$

This, therefore, represents a lower limit on station-to-station trip times for all gravity propelled vehicles traveling between stations of equal elevation. However, the required tunnel paths would be perfect cycloids that would begin and end with inclinations $\theta_o = 90°$ and have maximum depths given by $d = D/\pi$. The normal acceleration $a_n$, felt by the passengers (perpendicular to the vehicle's floor) at any intermediate depth $y$, ($0 \leq y \leq D/\pi$) is given $$a_n = 2g\ \frac{y\pi}{D}$$

Since the accelerations would range from 0 to 2 g's, these minimum trip time, cycloid paths would be unacceptable for ordinary passenger service.

In some cases it will be necessary to have some stations at different elevations. This does not result in serious losses in operating efficiency, however. The differences in station potential energy are absorbed by on-board flywheel inertial energy storage units with linear motor/generators. The excess kinetic energy arising when a vehicle departs one station and arrives at another station at a lower elevation is collected via regenerative braking and stored in the flywheel energy storage units to be used later when moving back up to another station at a higher elevation via the linear motors. Since the in-out efficiency of conventional flywheel energy storage units and linear motor/generators is high, no significant amount of energy is lost (i.e., the system still operates with very little input energy). The flywheel-linear motor/generator system is therefore an important element of the rapid transit system since it removes the restriction of having to place all stations at equal elevations.

The flywheel energy storage system can also be used to increase vehicle speed while coasting along long straight horizontal tunnel segments. The energy is recovered by regenerative braking and returned to the flywheel. Hence, the proposed rapid transit system will be referred to as a gravity/flywheel propelled system.

A detailed technical description of suitable flywheel alternator/motor inertial energy storage units can be found in U.S. Pat. No. 3,683,216 by Richard Post. The flywheel energy storage units are interfaced with the linear motor/generators by power conditioning systems usually consisting of high efficiency solid state cycloconverters. The operating principles of cycloconverters are described in detail in an article by George Pinter entitled "The Cycloconverter Adjustable-Speed Drive", *Machine Design*, June 23, 1966. In order to reduce reaction rail cost, a "transverse flux" single sided linear motor is used (see, "The Evolution of a Three-Dimensional Electric Motor", *Electrical Review*, Oct. 26, 1973, pp. 566–568 by E. R. Laithwaite; and "Linear Motor Topology", *Proceedings of the Institution of Electrical Engineers*, Vol. 120, No. 3, March 1973, pp. 337–343 by J. F. Eastham and E. R. Laithwaite).

Although the deep tunnel requirements may seem difficult to realize, this is not the case. The earth is actually more suitable for tunneling at deeper depths in bedrock and it can proceed economically by modern high speed tunnel boring machines without fear of running into existing subway tunnels, sewage tunnels or utility tunnels. However, high rock temperatures at great depths can sometimes be an important factor in determining maximum tunnel depths. In general, rock temperature $t$ is a linear function of depth $d$ and can be expressed by the formula $$t = t_o + Kd$$

where $t_o$ denotes the average surface temperature and $K$ denotes a constant depending on the underground geology at the particular location. (See Gutenberg's book, *Internal Constitution of the Earth*, Dover publications, Inc. 1951, pp. 107–149). For example, areas in Grass Valley, Calif. have $K = .00908°C$/meter and $t_o = 12.14°C$. Hence, at a depth $d = 5,000$ meters (16,400 feet), $t = 57.5°C$ (135.6°F). However, in Greenwood, New York, $K = .03241°C$/meter and $t_o = 4.29°C$. At a depth of 5,000 meters, the rock temperature at this location would be 166.3°C (331.4°F).

The average underground temperature gradient for continental United States is approximately 54.9 meters/C° which corresponds to $K = .01822°C$/meter. Assuming a maximum allowable rock temperature of 60°C (140°F) with $t_o = 10°C$ (50°F) the maximum depth would be 2,744 meters (9,003 feet). However, deep mines have penetrated to depths where rock temperatures exceed 60°C by employing refrigeration equipment. (See, "Making Western Deep Levels the World's Deepest Mine", *Engineering and Mining Journal*, Feb. 1972, pp. 87–89.) Hence, on the average, tunnels for the gravity/flywheel rapid transit system can be bored to depths of about 3,000 meters (9,842 feet). For circular tunnel paths with $\theta_o = 20°$ this depth corresponds to a station separation distance of 34,028 meters (21.1 miles). The trip time would be 3.76 minutes which is equivalent to an average surface speed of 150.9 meters/sec (337.5 mph).

Once the tunnel has been bored and the guideway installed the refrigeration equipment can be removed. The vacuum environment of the guideway confines heat transfer to the vehicles to radiant transfer only. This can be reduced by employing low radiant energy absorbing paint and materials for the vehicle's construction (as employed in the design of space vehicles). A strictly gravity propelled vehicle moving at a depth of 3,000 meters (9,842 feet) will have a coasting speed of 242.5 meters/sec (542.5 mph). This is about equal to commercial jet travel. When the gravity propulsion is augmented by flywheel propulsion, it may be possible to reach super-sonic speeds.

The above analysis clearly demonstrates the vast potentialities of a gravity/flywheel propelled rapid transit system. However, the determining factor in its competition with other systems depends upon construction costs. This depends largely upon the cost of tunnel construction. In order to keep tunnel boring costs to a minimum, the tunnel and vehicles are designed so that only one relatively small circular tunnel is able to accommodate two vehicles moving simultaneously in opposite directions (i.e., two-way traffic). This results in optimizing tunnel utilization and hence increased operational efficiency and lower costs. A transverse cross-section of this "split-level" tunnel design appears in FIG. 2.

The split-level vacuum tunnel 13 is rigidly mounted and supported within an outer tunnel 14 by steel rods 15. Although the initial tunnel 14 is bored with high accuracy, minor final adjustments for the alignment of the vacuum tunnel 13 are possible by adjusting the supporting rods 15. One end of these rods 15 is embedded in the concrete liner 16 of the outer tunnel 14 and the other end is attached to the vacuum tunnel 13 by an adjustable screw 11 that can be turned from inside the vacuum tunnel 13. These supporting rods 15 pass through circumferential steel collars 17 that run around the outside of the vacuum tunnel 13 and are welded to it. They provide additional support for the attachment of the steel rods 15 to the tunnel 13 and also serve as stiffeners for the tunnel 13. The distance between the tunnel liner 16 and inner vacuum tunnel 13 is varied by turning the adjustment screws 11. Although the screws 11 are made air-tight, they are further sealed (after final adjustment) with a suitable airtight sealer (that can be removed later for additional adjustments if needed). This mounting also allows economical realignment of the vacuum tunnel after many years of service in the event of a minor earth shift. The alignment accuracy is important because of the very high vehicle speeds and close clearances. According to a presently preferred embodiment, the initial tunnel 14 is bored to a diameter of 7.3 meters (24 feet) with a cross-sectional area of 41.8 meters$^2$ (450 feet$^2$). The tunnel liner 16, is reinforced concrete 50 cm (19.7 inches) thick. The nominal spacing between the concrete liner 16 and the outer wall of te vacuum tunnel 13 is 40 cm (15.75 inches). The vacuum tunnel 13 is constructed of high grade carbon steel with a thickness of 1.6 cm (.63 inches). The ribs 17 provide additional stiffening of the vacuum tunnel.

In order for the alignment of the inner vacuum tunnel to be constantly monitored, an alignment monitoring system using laser beams is provided. Three laser beams are transmitted parallel to the inside walls of the vacuum tunnel 13 through a series of holes through light sensitive sensors 18 located about every 50 meters. In a properly aligned straight tunnel section, the beams pass through all the holes without any irradiation of the sensors. When a tunnel section gets out of alignment, the beams fall partially on the light sensitive material surronding the target holes causing warning signals to be transmitted to the central control room. For curved sections, the sights have built in lenses and mirrors that bend and transmit the beams by a given angle corresponding to the tunnel's design radius of curvature. Thus, the system also identifies any misaligned curved sections.

A system of parallel support trusses 19, approximately 20.5 cm (8.1 inches) high inside the vacuum tunnel and perpendicular to its side walls, partition it into two corridors, one above the other. In the present embodiment these trusses are made of a light weight, temperature resistant, high strength material such as carbon fiber-epoxy composite (see, "Carbon Fiber Composites for Aerospace Structures", A. C. Ham, *Physics Bulletin, (British), Vol.* 20, p. 444, 1969; and *Popular Science*, Feb., 1969). These corridors form the vehicle passageways that enable two vehicles to move simultaneously in opposite directions through the same tunnel. A reaction rail 20 for the linear motor/generators carried by lower level vehicles is mounted along the bottom of these trusses. A similar reaction tail 20 is mounted along the ceiling of the upper level corridor for the upper level vehicles.

The split-level tunnel design calls for adopting unconventional vehicle designs. Thus, the vehicles (typically comprising trains of detachably coupled cars) operating on each level with very close clearances have generally semicylindrical shapes as shown in FIG. 3. The upper level cars 21 have flat bases while the lower level cars 22 have flat roofs. The close clearances are a result of the tunnel's vacuum environment, which eliminates aerodynamic drag and buffeting, and the employment of an exceptionally smooth riding magnetic levitation system with a narrow and essentially constant rail/vehicle gap. This is an important feature of the gravity/flywheel rapid transit system in that it allows maximum tunnel utilization and results in significant savings in the cost of tunneling, materials and construction.

Although the magnetic levitation system could be based upon ferromagnetic attraction using servo-controlled electromagnets as described in my aforementioned copending U.S. Patent Application, a system utilizing magnetic repulsion forces between like poles of permanent magnets offers considerable improvement. There are several distinct advantages, unique to permanent magnet suspension systems, that make them ideally suited for high speed gravity powered rapid transit systems. First and most important, a permanent magnet levitation system has zero magnetic drag at all speeds (see, "Mathematical Analysis of Permanent Magnet Suspension Systems", *Journal of Applied Physics*. Vol. 42, No. 4, Mar. 15, 1971, pp. 1528–1529, by Robert Borcherts). This is not true for any other magnetic levitation system. Secondly, all other magnetic levitation systems require some power expenditure to maintain levitation. A permanent magnet levitation system on the other hand requires zero power to maintain levitation. Other advantages in using permanent magnet levitation will become apparent later.

A permanent magnet levitation system for railway trains utilizing low cost ceramic magnets has been studied in detail at the British Rail Research Center at Derby (see, "Permanent Magnets Attract Industry", *Electrical Review*, Oct. 10, 1969, pp. 534–537). In particular, a permanent magnetic rail, called a "Magnarail", was developed so as to give maximum lift at minimum cost. It comprises a 15.24 cm (6 inch) wide mild-steel U-shaped channel in which relatively inexpensive ceramic magnetic bricks of barium/strontium ferrite are laid end to end with, for example, the north poles facing up and extending slightly above the mild-steel channel. The height of the rails is 5.7 cm (2.25 inches). The vehicle is supported by another identical rail, but inverted so that the north poles are pointed down. The mild steel around the sides of the magnet blocks almost completely eliminates leakage flux giving increased repulsive force. These details are described in the aforementioned paper. In view of the small clearances between poles, the bricks are ground flat and parallel on pole faces to give a thickness tolerance of .05 to .1 mm (.02 to .04 inches). Since the ferrite magnet bricks are relatively brittle, the poles are covered with a thin layer of protective epoxy resin material. (See, "Epoxy Resin Insulators for Overhead Lines", *Electrical Review*, June 15, 1973, pp. 26–29.) The British rails used an aluminum covering but this would generate eddy-currents and produce magnetic drag.

A "standard" ceramic Magnarail was developed by the British Rail Research Center with the following properties: length = 9.14 meters (30 feet), height = 5.7 cm (2.25 inches), total weight = 340 kg (750 lbs) (two-thirds of which is ferrite), total lift capability with .95 cm (.375 inches) between poles = 1,701.5 kg (3751.8 lbs) or 186.1 kg/meter (125.1 lbs/foot). Hence, a pair of these standard Magnarails produce a total repulsive force of 3403 kg (7504 lbs) for the same pole gap.

In the present embodiment the semi-cylindrical, magnetically levitated gravity/flywheel propelled train cars are suspended by two sets of three Magnarails 23 (FIG. 2) essentially equivalent to the British "standard" Magnarails. These Magnarails 23 are attached to the bottom of each car and extend parallel to each other over its entire length. Similar track Magnarails 24 are mounted on the trusses 19 for upper level vehicles and on a platform 25 for lower level vehicles. Thus, the vehicles are levitated by six Magnarails which make available a combined lifting force of 1,117 kg/meter (750.7 lbs/foot) with a pole-to-pole separation distance of .95 cm (.375 inches).

Figure 4:
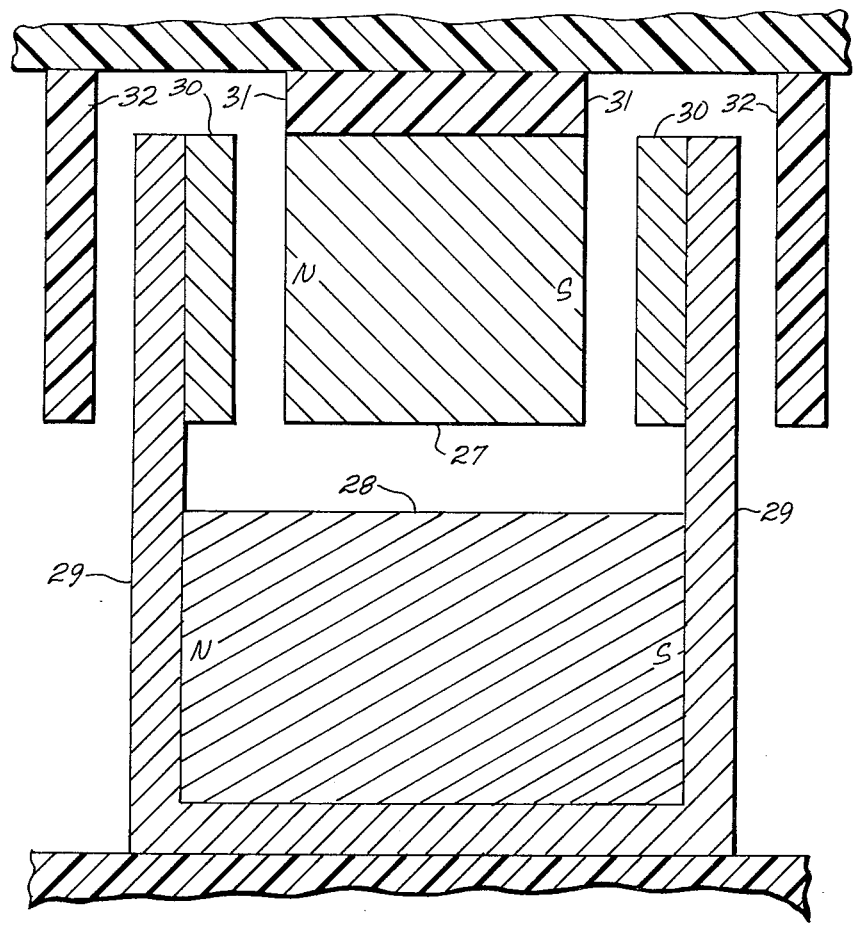
FIG. 4 illustrates a transverse vertical cross-section of the car's lateral guidance system utilizing self-centering permanent magnets.

In order to maintain the permanent magnetic levitation, the vehicle Magnarails 23 must maintain a position directly above the corresponding track Magnarails 24. However, unless some form of lateral guidance is provided, the vehicle will float in an uncontrollable manner and eventually drift away from the required position over the track Magnarails. If the vehicle Magnarails 23 move to a position approximately 3.2 cm (1.25 inches) out of alignment on either side of the track Magnarails 24, the repulsive force becomes an attractive force and the levitation will be completely lost. Thus, a lateral guidance system 26 is provided that is also based upon utilizing drag-free repulsive forces between like poles of permanent magnets. The details of this system are shown in FIG. 4.

The lateral guidance system is made self-centering by attaching additional permanent magnets 27 side by side along a line on the bottom and directly below the center of each car. Here, however, the poles are oriented horizontally, perpendicular to the levitating Magnarails. A similar row of permanent magnets 28 are laid directly below and between the two sets of track Magnarails 24 with their poles oriented in the same horizontal direction as the vehicle guidance magnets 27. These magnets 28 are mounted inside a U-shaped mild-steel channel 29 that directs the flux of the magnets 28 upward to pole pieces 30 that form a horizontal gap. The vehicle's guidance magnets 27 ride between the poles 30 of this gap. The guidance magnets 27 stand away from the vehicle by mounting them on a thin non-metallic platform 31 so that they are vertically centered between the pole faces 30. If the vehicle moves too far to one side of the track's centerline, an unbalanced force of repulsion develops that tends to keep the guidance magnets 27 centered between the poles 30. Although the pole faces and bottom of the vehicle guidance magnets 27 are protected by a thin layer of epoxy resin, vertical nylon stand-off skids 32 mounted on the vehicle on each side of the guidance magnets 27 prevent the pole faces of the magnets 27 from accidentally striking the pole faces 30 of the mild-steel channel 29. Similar nylon stand-off skids 33 (FIG. 2) are mounted on the vehicles above skid-rails 34 that run parallel to the track Magnarails 24. These skids 33 prevent the vehicle levitation Magnarails 23 from accidentally striking the track Magnarails 24. Unlike all other noncontact levitation systems for high speed ground transportation, the above system utilizing permanent magnets provides both levitation and guidance without consuming any energy and without creating any magnetic drag.

Figure 5:
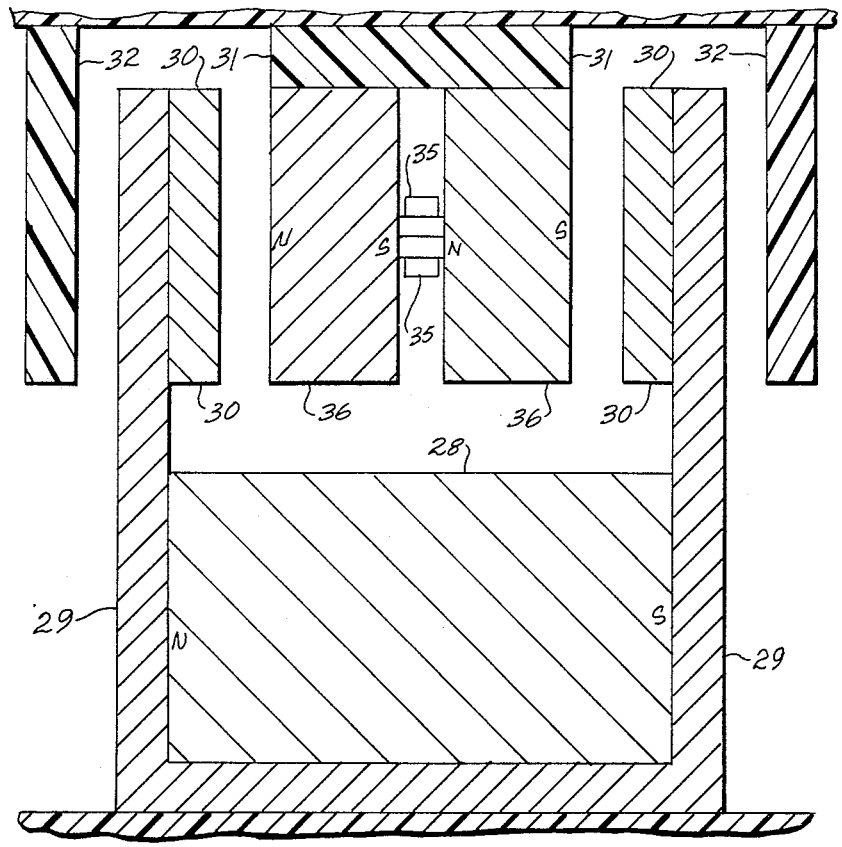
FIG. 5 illustrates a transverse vertical cross-section of the car's lateral oscillation dampening system.

In order to prevent possible unwanted lateral or vertical oscillations from building up on the vehicle, electromagnetic damping systems are provided. The components of the lateral damping system are shown in FIG. 5. Approximately 5% of the vehicle's self-centering lateral guidance magnets are fitted with low power, servo-controlled electromagnets 35. Thus, the flux in the controlled lateral guidance magnets 36 can be changed by applying a current to the electromagnets 35. The current to these electromagnets 35 is controlled by inertial sensors on-board the vehicle that sense small lateral oscillations. The sensors respond to these oscillations by directing current to the electromagnets 35 which dampen out the oscillations.

Figure 6:
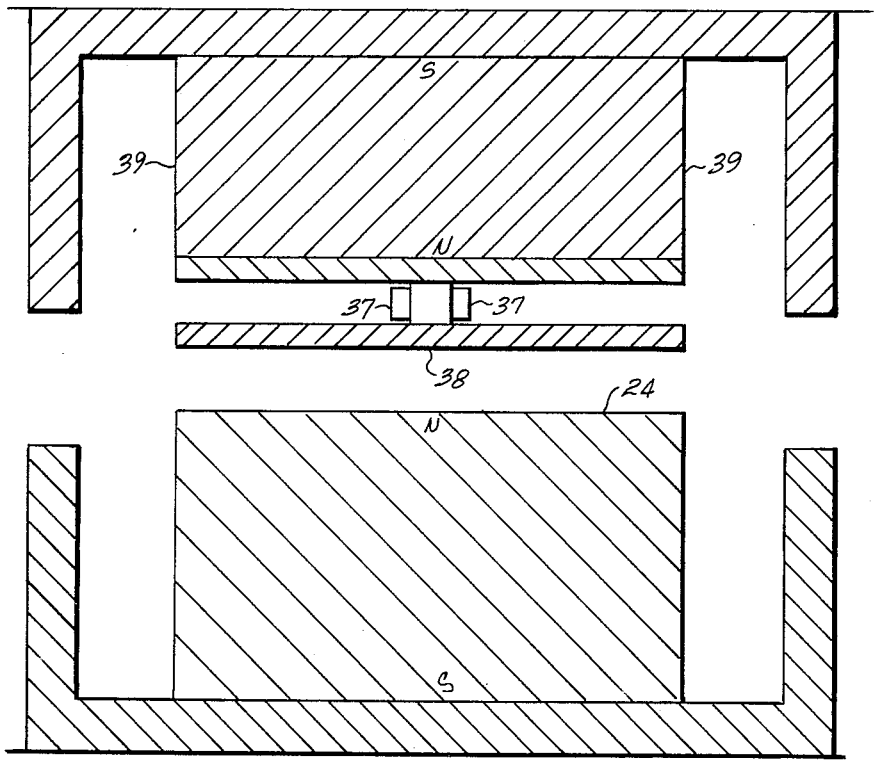
FIG. 6 illustrates a transverse vertical cross-section of the car's vertical oscillation dampening system.

A similar system is shown in FIG. 6 for damping out vertical oscillations. Approximately 5% of the permanent magnet bricks mounted in the vehicle's levitating Magnarails are fitted with low power, servo-controlled electromagnets 37. The bottom of these electromagnets 37 are attached to mild-steel pole plates 38 that face the track Magnarails 24. Thus, the flux in the controlled levitation magnets 39 can be changed by applying a current to the electromagnets 37. The current to these electromagnets 37 is controlled by inertial sensors that sense small vertical oscillations. The sensors respond to these oscillations by directing current to the electromagnets 37 which dampen out the oscillations. The total power required to operate all of the lateral and vertical oscillation dampening electromagnets for a single car does not exceed approximately 200 watts. Notice that if all the current is cut off from the lateral and vertical oscillation dampeners, the car's levitation and self-centering guidance forces will remain essentially unchanged. This represents a valuable built in fail-safe feature of the oscillation dampening system.

Since the permanent magnet levitation system described above results in very little lateral or vertical motion relative to the tunnel corridors, very close clearances between the vehicle and tunnel are possible. Thus, according to a presently preferred embodiment the dimensions of upper level and lower level cars are as follows: length = 18.2 meters (59.71 feet), maximum exterior heights of upper level cars 21 and lower level cars 22 are 2.28 meters (7.48 feet) and 2.14 meters (7.04 feet) respectively. The clearance between the tunnel walls and both upper level and lower level cars is 13.4 cm (5.28 inches). The cars preferably have a pressurized double hull design and are constructed of light weight, non-metallic, high strength materials such as carbon fiber-epoxy composites.

Each car has a seating capacity of 52 and a gross empty weight of 18,000 kg (39,690 lbs) consisting of 4,500 kg (9,920 lbs) of vehicle Magnarail and lateral guidance magnets, flywheel energy storage units 40 that weigh from 500 kg (1,103 lbs) to 3,000 kg (6,615 lbs) depending upon specific needs, and 500 kg (1,103 lbs) for the linear motor/generator 41. (Each flywheel energy storage unit will weigh 500 kg and each car will contain from one to six units.) A minimum of about 10,000 kg (22,050 lbs) is left for the body, life support systems and power conditioner. With a load of 52 passengers, each car has a gross weight of about 21,500 kg (47,407 lbs).

The perpendicular force of repulsion between the vehicle and track Magnarails is $Mg \cos\theta$ (where M is the total vehicle mass) which is maximum when $\theta = 0$ (i.e., when the vehicle is horizontal). The gap distance between the opposing levitation Magnarails for horizontal empty and fully loaded cars can be calculated by using a detailed lift force versus gap distance graph determined by Polgreen based on the "standard" Magnarail adopted essentially without change in the preferred embodiment (see, "Rail-Ways With Magnetic Suspension", *The Engineer*, Oct. 25, 1968, pp. 632–636). The results of this calculation shows that empty cars float 1.61 cm (.635 inches) above the track Magnarails while fully loaded cars float 1.20 cm (.472 inches) above the track Magnarails.

Figure 7:
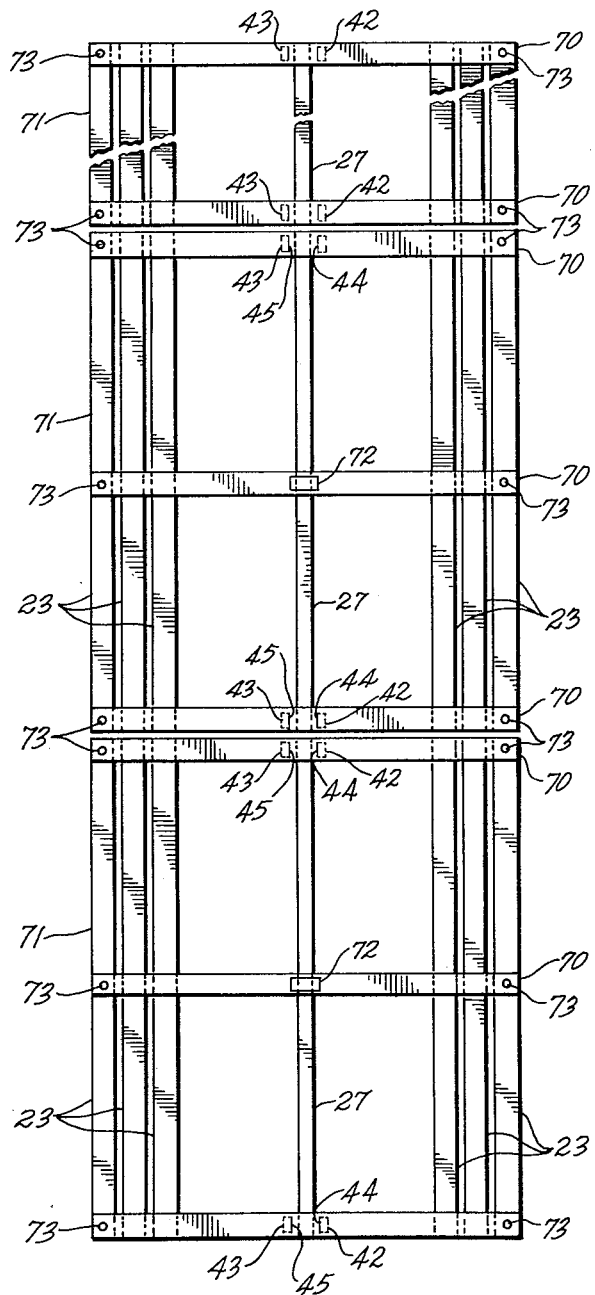
FIG. 7 illustrates a transverse horizontal cross-section of the car's independent suspension system.

The distance between the pole faces of the car Magnarails 23 and track Magnarails 24 must remain essentially constant for a given car weight. But this would be impossible when moving along sharp vertical transitional curves if the car's Magnarails were straight and inflexible. For example, suppose that a small section of horizontal track ($\theta = 0$) at a station begins to arc downward with an initial radius of curvature equal to 600 meters (in the vertical plane). Then the ends of a straight rigid rail 18.2 meters long passing over this transitional curve will be 6.9 cm (2.7 inches) higher above the curved track rail than its center. However, if the straight rail were only 3 meters long, the ends would only be .12 cm (.05 inches) higher. Hence, in order to pass over curves of low radius of curvature with very nearly constant distance between car Magnarails 23 and track Magnarails 24, the car Magnarails 23 and lateral guidance magnarail 26 are cut along perpendicular lines into six equal sections, 3 meters (9.84 feet) long. The six Magnarails 23 and guidance Magnarail 27 in each section are rigidly connected to cross beams 70 so that each section is structurally rigid and forms an independent suspension unit 71 complete with its own oscillation dampening sensors 72 and dampening electromagnets. FIG. 7 is a transverse horizontal cross-section illustrating these suspension units for lower level cars viewed from above. Each unit is separated longitudinally from its neighboring units by 4 cm (1.57 inches) and are free to yaw and pitch about ±1° relative to each other in both horizontal and vertical planes. Collectively, these units 71 provide the car with a suspension system which allows it to pass smoothly over curves in both vertical and horizontal planes while maintaining its levitating Magnarails 23 properly positioned directly above the track Magnarails 24 with essentially constant separation distance. The suspension system also distributes the total weight of the car evenly among the six individual suspension units by suspension springs 73 which are connected to the car's bottom. The resulting minimum allowed tunnel radius of curvature (determined by the vehicle/tunnel wall clearance) is about 400 meters.

The gravity/flywheel propelled magnetically levitated vehicles also have the ability to perform tunnel switching (although only at relatively low speeds). The switching mechanism involves activating one of two pairs of guide plates 42, 43 (FIG. 2 and FIG. 7) located in each of the car's six suspension units and on each side of the center line. The plates are 10 cm (3.9 inches) long, 2 cm (.78 inches) wide and 10 cm high (when extended) and each member of the pair lies near each end of the units. FIG. 2 and FIG. 7 show the two pairs 42, 43 in a folded up, retracted configuration. When approaching a tunnel intersection one of the two pairs in each suspension unit is folded down (like flaps on the wing of an airplane) on colinear hinge axes 44, 45 (FIG. 2) parallel to the car's longitudinal center line. (Only pairs lying on the same side of the car are folded out.)

Figure 8:
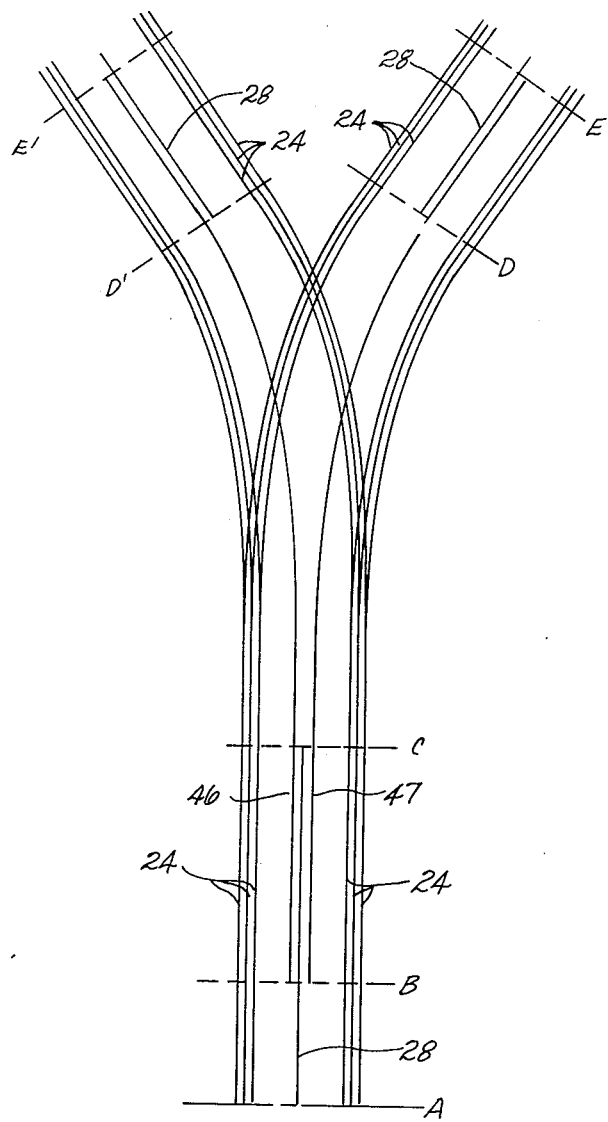
FIG. 8 is a schematic horizontal cross-section illustrating the tunnel switching system.

In the immediate vicinity of each tunnel intersection, the track lateral guidance Magnarails 28 are replaced by guide slots 46, 47 (see FIG. 8). Suppose a lower level car is approaching the intersection as shown in FIG. 8 and is required to take the right branch. Then, assuming that the lower level car shown in FIG. 2 is moving away from the viewer, all right hand guide plates 42 are swung down to a vertical position by pivoting about the right hand hinges 44 when the vehicle reaches point A. (The vehicle is moving upward in FIG. 8.) Consequently, when each of the right hand guide plates 42 reach point B, they slide into the right hand guide slot 47. The clearance between the slot and plates is about .2 cm (.08 inches) and therefore constrains the car's lateral movement more than the regular guidance Magnarail 28. By the time the car reaches point C, all of its right hand guide plates 42 are sliding along in the right hand track guide slot 47. The regular track lateral guidance Magnarail 28 is terminated at this point. Since the right hand track guide slot 47 follows the right hand tunnel branch, the vehicle is therefore guided into the branch with proper lateral guidance. The regular track guidance Magnarail 28 for this tunnel branch begins at point D. After the vehicle leaves point E, the right hand track guide slot 47 ends and the vehicle guide plates 42 are retracted. The vehicle continues under the control of the regular track lateral guidance Magnarail 28. The vehicle passing point A could have taken the branch leading to the left by activating its left guide plates 43 instead of its right guide plates 42.

The inner vacuum tunnel 13 (FIG. 2) is evacuated to and pressure sealed at $10^{-3}$ torr. Relatively low power pumps 48 (FIG. 1) located near the stations maintain this pressure by compensating for air leakage (which can be small if adequate pressure sealing designs are used). The individual cars have a frontal aerodynamic shape factor of 0.88 (see, *Theoretical Hydrodynamics*, Macmillan Pub. Co., p. 306 by L. Thomson). Since their frontal cross-sectional area is 10.62 meters$^2$, the tunnel blockage ratio (cross-sectional area of vehicle divided by cross-sectional area of tunnel) is .45 and the aerodynamic drag (which is essentially the only drag) at 140 meters/sec (313 mph) is approximately 2.9 ounces (see, "A Parametric Model of High Speed Ground Transportation", Transportation Research, Vol. 3, 1969, pp. 318–319 by G. Hoffman and "Aerodynamics of Tube Vehicle Systems", High Speed Ground Transportation Journal, Vol. 4, No. 3, Sept., 1970). For a vehicle speed of 500 meters/sec (1,118 mph) the drag increases to about 2.3 lbs. Hence, for all practical purposes it can be assumed that the gravity/flywheel propelled vehicles will move essentially without friction.

Figure 9:
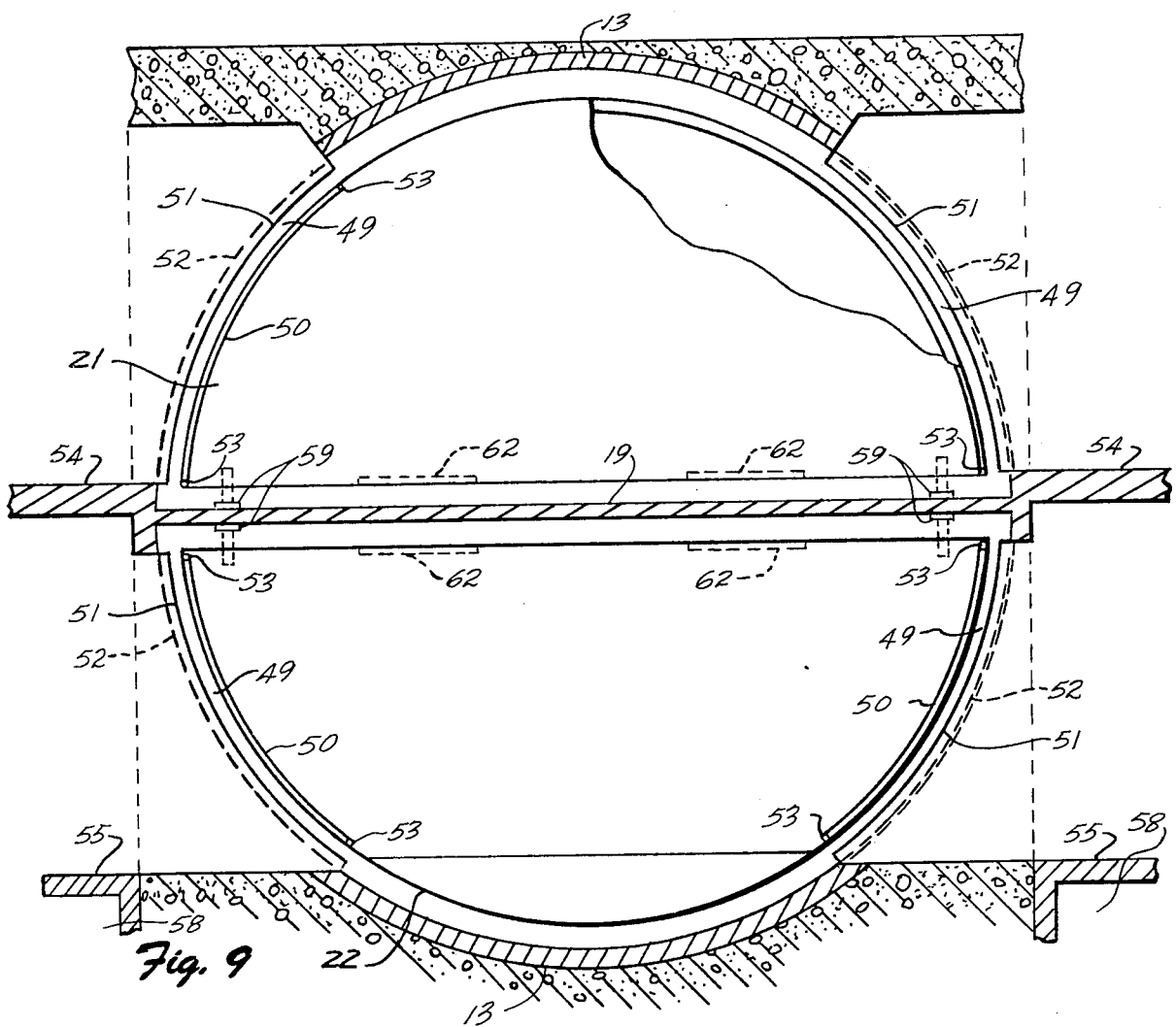
FIG. 9 is a transverse vertical tunnel cross-section illustrating the air-locks that permit direct passage between a car's interior and a station platform while the car remains in a hard vacuum environment.

The constant, hard vacuum environment of the tunnel guideway requires features not common to prior art rapid transit systems. Each operating vehicle is constantly exposed to this hard vacuum even while at a station during the boarding and unboarding of passengers or freight. A system of air-locks 49 (FIG. 9) is provided in each station for both upper level and lower level vehicles which engage only the doors, leaving all other parts of the vehicles exposed to the tunnel's vacuum. The air-locks 49 are equally spaced in each station so that when a train is stopped at a certain position, all the car doors 50 are opposite air-locks 49. The air-locks 49 engage each door 50 by flanges 51 that completely surround air-tight doors 52 in the tunnel walls (FIG. 3). When the flanges 51 are extended they fit into air-tight slots 53 that also completely surround each car door 50. The effect of this connection seals off a small volume of space bounded by the flanges 51, the car door 50 and the tunnel wall door 52 and forms the air-lock 49. Air is allowed to pass into this air-lock 49 until atmospheric pressure is reached. The car doors 50 and tunnel wall doors 52 are then opened allowing passengers to move between the station and each car while the exterior of the car remains in the tunnel's hard vacuum environment. The interiors of each station adjacent the vacuum tunnel 13 have two levels, one level 54, serving passengers riding on upper level trains 21 and the other 55, serving passengers riding on lower level trains 22 (FIG. 9).

Before leaving the station, the car doors 50 and tunnel wall doors 52 are closed and the air is evacuated from the air-locks 49. Since the volume of the air-locks 49 is small (e.g., 10 liters or less) it does not take long to evacuate it down to $10^{-3}$ torr. If the train is composed of 5 cars there are 10 air-locks to evacuate simultaneously. This is accomplished in two stages. First, a valve connected to a vacuum conduit 56 that leads to a central oil-seal vacuum pump is opened in each air-lock so that the pressure is reduced to about 1 torr. This takes less than 5 seconds. The valves are then closed and another valve located just below each air-lock is opened. This valve is connected to another vacuum conduit 57 that leads to a large vacuum tank 58 (FIG. 9) of about 20 cubic meters evacuated to a pressure of about $10^{-6}$ torr. Each station is provided with two of these vacuum storage tanks 58 for the air-locks 49 on each of the two levels. Thus, when these second valves are opened in each air-lock, the pressure is further reduced to about $10^{-3}$ torr or less, depending upon how many air-locks dump their residual air in the common vacuum storage tank. A relatively low power diffusion pump, that operates continuously, restores the vacuum storage tank 58 to its $10^{-6}$ torr level before the next train arrives. The pressure reduction from 1 torr to $10^{-3}$ torr in each air-lock is accomplished very quickly when the second valves are opened. The flanges 51 are then retracted and the train departs. This is an important feature of the system because it allows the train to depart from the station without having to wait a long time until an operating level vacuum has been restored by way of large air-locks that contain an entire car or train. Larger air-locks are, of course, used for adding or removing cars.

When a train arrives at a station it must be stopped at a precise point so that each car door 50 is properly positioned to receive the flanges 51. The vehicle coupling system keeps the cars separated by a constant distance even under compression or tension forces. In order to insure proper door-flange alignment for each car, each car must be accurately positioned both vertically and horizontally. The correct horizontal positioning is accomplished initially by computer controlled regenerative braking that stops it within 10 cm (3.94 inches) of a preset stopping point. After this is accomplishd, a pair of positioning arms 59 (FIG. 9), that are attached to some of the horizontal trusses 19, flip down on each side of lower level cars and flip up on each side of upper level cars, moving each car slightly to the correct final horizontal position with high accuracy, say ±.1 cm (.04 inches). These positioning arms also serve as electrical conduits which feed in electrical current that is used to spin up each car's flywheels. Then, while these flipper arms still hold and align each car horizontally, the skid rails 34 on each side of the train (which may be 10 cars long) rise and lift the entire train slightly until its upper nylon skids 60 are pressed firmly against skid rails 61 that ordinarily prevent the faces of the linear motor/generators from striking the reaction rail 20. This system aligns each car to the correct vertical position (with say ±.1 cm accuracy). After this is accomplished, the flanges 51 are extended into the slots 53 surrounding each door and air-lock pressurization begins. After the train makes its initial stop, alignment and air-lock pressurization is completed in all cars in about 15 seconds and the doors are opened.

Each car has two doors 50 located on opposite ends and opposite sides. Passenger movement proceeds efficiently by allowing passengers to enter the car by one door and exit through the other. After passengers (and/or freight) have been exchanged, the doors are closed and the air-locks 49 are evacuated. The skid rails 34 are lowered, the flipper arms 59 are raised and the train departs from the station about 25 seconds after the doors are closed. The cabin of each car is pressurized to atmospheric pressure and equipped with its own life support equipment and environmental control systems that includes pressurized air tanks, air conditioners and circulators, temperature and humidity regulators, carbon dioxide removal systems, air purifiers, lighting, etc., with adequate reserves in the event a vehicle is stopped between stations due to malfundtion. Emergency oxygen masks are provided above the seats which automatically appear in the event of a serious loss of cabin pressure. (Adequate reserve air is carried to compensate for relatively small punctures in the cabin causing a drop in pressure.) Each car in a train is connected to adjacent cars by umbilical lines so that pressurized air or electric power can be supplied from neighboring cars if needed.

Figure 10:
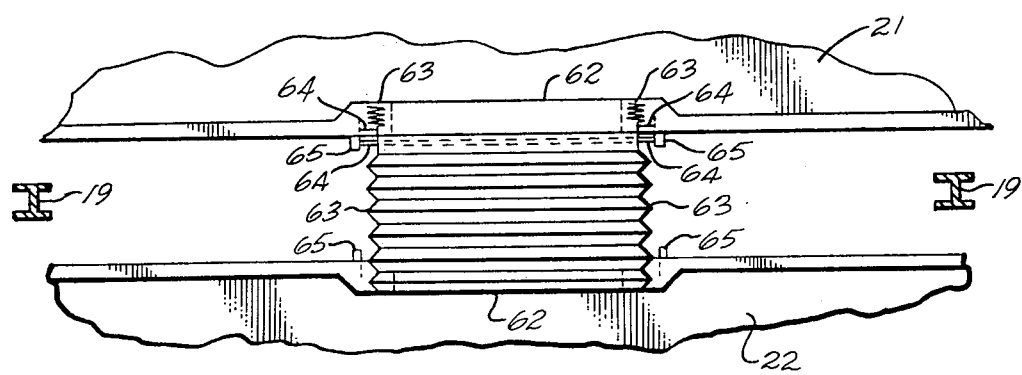
FIG. 10 illustrates an emergency escape air-lock system.

Means are provided by which all passengers can be safely evacuated from a vehicle in case it is stopped anywhere in the tunnel due to a malfunction without having to pressurize the entire tunnel system or without having to tow the vehicle to the nearest station before evacuation. As illustrated in FIG. 10, a small, air-tight circular escape hatch 62 is installed directly in front of each door 50 on the floors of upper level cars 21, and on the ceilings of lower level cars 22 (see also FIG. 9). They are located such that when a lower level car 22 is directly under an upper level car 21, the escape hatches 62 are directly opposite each other on each side of the partition frame 19 and not obstructed by any rails. Each escape hatch 62 is equipped with a retractable flexible tube 63, with an expanding end diameter 64, that can be extended manually between the open partition beams 19 to engage an air-tight circular rim 65 surrounding the other escape hatch 62. The air-lock, resulting from the connection, is then pressurized to atmospheric pressure so that the escape hatches 62 in both vehicles can be opened. Thus, every upper level vehicle 21 is capable of rescuing passengers stranded in a lower level vehicle 22 and vice versa.

There are two escape hatches 62 in each car. The longitudinal distance between these two hatches 62 is not commensurate with a multiple of the distance between adjacent transverse cross beams 19 that comprise the partition frame within the vacuum tunnel 13. Thus, if one hatch 62 is obstructed by such a supporting beam 19, the other hatch 62 will automatically be free of such obstruction. This escape system arrests possible psychological fears a person may have regarding the possibility of becoming stranded within a vehicle confined within a small vacuum tunnel deep underground far away from the nearest station. Since no costly emergency tunnel pressurization system and tunnel escape doors and passageways are required in this escape system (nothing need be added to the tunnel system) its implementation does not increase tunnel construction cost.

The above described gravity/flywheel powered rapid transit system can offer extremely efficient, nonpolluting, all weather, high speed underground transportation for (1) urban systems, (2) intercity systems and (3) intercontinental systems. For urban systems the tunnel paths are very nearly arc segments of circles lying in the vertical planes passing through adjacent stations. The vehicle's flywheels are used primarily as on-board energy depositories for absorbing and generating excess kinetic energy arising from traveling between stations of different elevations and for stopping and starting at each station. This scheme is adopted because energy transformations between gravitational potential energy and kinetic energy is essentially 100% efficient while energy passage between the linear motor/generators and flywheel energy storage units will always result in some energy loss due to inherent inefficiencies. Unless the present physical laws of motion are overthrown, the urban gravity/flywheel rapid transit system offers extremely swift station-to-station, non-energy consuming service that could never be matched by any surface rapid transit system that doesn't restrain its passengers to their seats.

For intercity systems where typical station separation distances might average 100 km (62.1 miles), tunnel depths for gravity/flywheel rapid transit run between 1,000 meters (3,281 feet) and 2,000 meters (6,562 feet) and give gravity coasting speeds of 140 meters/sec (313 mph) and 198 meters/sec (443 mph) respectively. A gravity/flywheel rapid transit system is ideally suited for the critically important and much needed "Northeast Corridor" system where the surface congestion and costly right-of-way problems would be completely eliminated by deep underground tunneling (see, "Recommendations for Northeast Corridor transportation," Vol. I–III, U.S. Dept. of transportation, May, 1971). It will also provide an ideal system for directly linking the major cities of Europe (such as London and Paris).

Finally, the gravity/flywheel powered rapid transit system also has the capability of providing underground inter-continental transportation that will be significantly faster than commercial jet airplanes, yet consume only a small fraction of the energy they consume. Since the vehicles will move essentially without any drag forces, the coast distance along a horizontal tunnel segment is independent of energy expenditure. The cruising speed along the horizontal segment can be significantly increased by flywheel propulsion. The added energy is recovered before the vehicle reaches the ascending part of the tunnel by regenerative braking. Thus, for inter-continental rapid transit systems each car will carry 3,000 kg (6,615 lbs) of flywheel energy storage units.

According to Post (see, U.S. Pat. No. 3,683,216) a conservative estimate for the energy storage capacity of 3,000 kg of flywheel inertial energy storage units is about $2.5 \times 10^9$ Joules. However, the environmental and control systems of each car require only about 10 KW of continuous electrical power. If the car is propelled by gravity alone this essentially is all the power that is needed - which is negligable compared to the car's flywheel on-board energy storage capability. For inter-continental systems, this flywheel energy will therefore be used to boost the gravitational coasting speed to higher levels.

An an example, suppose that the horizontal depth, below sea level, of a straight San Francisco-New York 4,140 km (2,573 mile) long inter-continental rapid transit vacuum tunnel is 1,000 meters (3,281 feet). When passing under the continental divide the tunnel will be about 3,500 meters (11,500 feet) below the surface. Suppose that a vehicle, composed of several of the above described gravity/flywheel propelled cars, departs San Francisco for New York. It will require approximately .70 minutes to reach the 1,000 meter cruising depth when its gravity coasting speed will be 140 meters/sec (313.8 mph). As soon as the vehicle levels off and begins to move along the straight horizontal part of the tunnel it turns on its linear motors. If all of the $2.5 \times 10^9$ Joules of stored flywheel inertial energy is used to accelerate each car (with a full load of 52 passengers) the vehicle's speed will be boosted to 502.2 meters/sec (1,123.3 mph). If the linear motor in each car is rated at 1,200 KW, this boosting acceleration will take approximately 34.7 minutes during which time the vehicle travels over a distance of 739.8 km (460 miles) when it will be just entering the state of Utah. (Locating the power source on board the vehicle plays an important role since it would be almost impossible to collect power from a "third rail" at speeds above 300 mph.)

After the energy is drained from the flywheels and converted into kinetic energy, the vehicle resumes its coasting (at the increased speed) for about 88.11 minutes during which time it travels a distance of 2,655 km (1,650 miles). At this point the vehicle will be passing almost directly below Toledo, Ohio. It then begins the regenerative braking which generates about 1,200 KW of electric power which is used to spin up the flywheels, returning almost all of the $2.5 \times 10^9$ Joules extracted during the boost phase. After the vehicle slows back down to 140 meters/sec, the ascending reach of the tunnel begins and the vehicle coasts all the way up converting its remaining kinetic energy into potential energy. The vehicle essentially automatically comes to a stop when the top of the climb is reached right in the heart of New York City. The entire trip takes about 2 hours and 39 minutes, giving an over-all average speed of 434 meters/sec (971 mph). If, according to Post, the electrical in-out efficiency of the flywheel energy storage units is 95% and if the efficiency of the linear motor/generators were 85%, approximately $8.7 \times 10^8$ Joules of energy per car would be lost due to inefficiencies. At a rate of 2 cents per kilowatt-hour this represents a total of $4.83 per car or about 9 cents per person.

The operation of gravity/flywheel vehicles is almost the direct antithesis of aircraft operations. For example, a large commercial jet airliner, say a Boing 747, begins its trip by climbing to high altitudes. If its gross take-off weight is 340,000 kg (750,000 lbs) and if its cruise altitude is 10,500 meters (34,450 feet) the climb requires an energy expenditure of about $3.6 \times 10^{10}$ Joules (which is unrecoverable). A gravity/flywheel vehicle, on the other hand, begins its trip by descending and therefore generating energy which is automatically converted into kinetic energy and used to complete the trip.

The practicality of the gravity/flywheel rapid transit system depends upon construction and maintenance costs — the major contributing element of which is tunnel construction. But, with the aid of automatic devices these costs can be kept reasonably low. The tunnel design adopted in the preferred embodiment is ideally suited for economical high speed boring. Modern high speed automatic tunnel boring machines guided by laser beams are already available (see, "Rock mole finishes bore in a flourish of records," *Construction Methods and Equipment*, March, 1973, pp.106–110 by David Etheridge; and "Deep in the Earth with the Monster Moles," *Popular Science*, August, 1973, pp. 84–87 by Robert Gannon). The tunnel's interior does not require any costly ventilation systems, side passageways, escape hatches, lighting, power pickup "third rails", or power generating stations. Of course, many continually operating vacuum pumps will have to be provided to compensate for air leakage but these can be centrally located. Moreover, with modern materials and vacuum seals that have essentially no leaks the air leakage problem is not great.

Although many thousands of tons of permanent ceramic brick magnets will be required, the raw materials they come from are very cheap and are plentiful. The ceramic methods common to ordinary brick-making can be applied to develop fully automatic manufacture of the brick magnets on a mass production basis. (The size and shape of all track brick magnets is identical.)

Construction costs are high compared to other rapid transit systems but these costs have to be weighed against the obvious benefits. Earthquakes will present special construction problems for areas such as California (they are practically nonexistant east of the Mississippi River) but recent research indicates that it will be possible to predict earthquakes in advance and even control their intensity (see, "Earthquake Prediction", *Physics Today*, March, 1974, pp.36–42 by C. Kisslinger).

Many modifications and variations of the above embodiments can be devised by one skilled in the art. Thus, for example, instead of using ceramic magnets in the vehicle, much more powerful cobalt rare earth permanent magnets such as $SmCo_5$ could be used. This would double the distance between the tunnel's Magnarails and the vehicle's Magnarails. Similar magnets could be used for the vehicle's lateral guidance system. The geometrical arrangement of the levitating Magnarails could also be changed. The track and vehicle Magnarails could be placed above the vehicle in monorail suspension systems. As various changes can be made in the above construction without departing from the scope of the invention, it is intended that all matter contained in the above description or shown in the accompanying drawings should be interpreted as illustrative and not in a limiting sense.

What is claimed is:

1. A rapid transit system comprising:
   a plurality of stations;
   tunnels extending underground between adjacent stations of said system;
   means for evacuating and maintaining vacuum in said tunnels;
   a plurality of magnetic rails composed of permanent magnets of high coercivity extending along the full length of the tunnel;
   a vehicle in the tunnel;
   a plurality of magnetic rails composed of permanent magnets of high coercivity extending lengthwise on the vehicle for levitating the vehicle above the tunnel's magnetic rails by magnetic repulsion so that no part of the vehicle is in physical contact with any part of the tunnel when it is moving between stations;
   permanent magnet guidance rail means extending along the tunnel;
   self-stabilizing, permanent magnet guide means on the vehicle in repelling spaced relationship with the guidance rail means for maintaining the vehicle's levitating magnetic rails properly aligned over the tunnel's levitating magnetic rails;
   said vehicle being propelled essentially entirely by gravity when moving from one station to another station at equal elevations where acceleration propulsion is obtained by coasting down one sloping arc of the vacuum tunnel, thereby converting gravitational potential energy into kinetic energy, and where deceleration is obtained by coasting up another sloping arc of the tunnel, thereby converting kinetic energy back into gravitational potential energy to be used later for making the next trip;
   means for starting and stopping said vehicle in the immediate vicinity of each station; and
   an air lock at each station through the vacuum tunnel to allow passage between a station and the interior of the vehicle when stopped at the station without removing the vacuum environment from the tunnel surrounding the vehicle at the station.

2. A rapid transit system as set forth in claim 1 wherein the paths of at least a portion of said tunnels trace out smooth continuous curves lying essentially in the vertical planes passing through adjacent stations.

3. A rapid transit system as set forth in claim 1 wherein the path of at least a portion of said tunnels between adjacent stations comprises two continuously curving arcs sloping downwardly from each station separated by a straight horizontal path located at the maximum depth such that the entire path lies essentially in the vertical plane passing through the adjacent stations.

4. A rapid transit system as set forth in claim 1 further comprising means on the vertical for recovering and storing excess potential energy when moving from one station at a higher elevation to another station at a lower elevation; and
   means for using the stored energy later in propelling the vehicle from a station at the lower elevation to a station at a higher elevation.

5. A rapid transit system as set forth in claim 4 wherein said means for recovering, storing and using excess kinetic energy derived from moving between stations of different elevations comprising:
   a reaction rail extending along the tunnel;
   regenerative linear motors for regenerative braking and propulsion without physically contacting the reaction rail; and
   flywheel motor-alternator energy storage units located on-board said vehicle for transforming incoming electrical energy derived from regenerative vehicle braking into flywheel inertial energy for storage and for transforming stored flywheel inertial energy into electrical energy to power said linear motors.

6. A rapid transit system as set forth in claim 1 further comprising means for increasing the vehicle's speed by using additional energy stored on-board the vehicle; and
   regenerative braking means for later recovering the energy on-board the vehicle during deceleration.

7. A rapid transit system as set forth in claim 1 wherein the tunnel's permanent magnetic rails lie along a lower portion of the tunnel and directly under the vehicle's magnetic rails and said means for maintaining the vehicle's magnetic rails properly aligned laterally over the tunnel's magnetic rails so as to produce maximum repulsive levitation comprises:
- a row of permanent magnets extending along the tunnel with north and south poles oriented along parallel lines perpendicular to the tunnel's levitating magnetic rails;
- a U-shaped mild-steel channel having said row of permanent magnets mounted therin for directing the magnetic flux upward to pole pieces so as to form a continuous horizontal flux gap above and parallel to the lower magnets;
- a row of permanent magnets mounted on and extending along the vehicle's bottom between and parallel to its levitating rails with north and south poles oriented transverse to the rails and parallel to said tunnel magnets such that the row rides between said horizontal flux gap of the mild-steel channel and repelled away from each pole;
- the repulsion forces across the gaps keeping the vehicle properly aligned laterally so that its levitating magnetic rails ride directly above the tunnel's magnetic rails giving stability with maximum levitation force.

8. A rapid transit system as set forth in claim 7 further comprising:
- skid rails mounted along the tunnel;
- stand-off skids mounted on the vehicle that ride above said skid rails to prevent accidential contact between the levitating magnets; and
- stand-off skids mounted on each side of said vehicle's row of lateral guidance magnets to prevent accidental contact between the magnets and said pole faces.

9. A rapid transit system as set forth in claim 7 wherein said permanent magnet levitation and lateral guidance means include means for controlling and dampening out vertical and horizontal oscillations comprising:
- servo-controlled electromagnets fitted to some of said vehicle's levitating and guidance magnets;
- inertial oscillation sensors on-board said vehicle that sense vertical and horizontal oscillations that control current feeding said electromagnets so as to dampen out possible vertical and horizontal oscillations.

10. A rapid transit system as set forth in claim 9 wherein said permanent magnet levitation, lateral guidance and oscillation dampening systems comprise a number of rigid but independent vehicle suspension units that are free to move slightly in transverse and vertical planes so that said vehicle can negotiate curves of relatively small radius of curvature while each independent suspension unit remains properly positioned over the track magnetic rails.

11. A rapid transit system as set forth in claim 10 further comprising means for switching a vehicle into a branching tunnel intersection, said means comprising:
- retractable guide plates mounted in each of said independent vehicle suspension units;
- guide slots mounted in the immediate vicinity of tunnel intersections adjacent said magnetic levitation rails and a constant distance from them, wherein one guide slot proceeds a short distance into one tunnel branch and another guide slot proceeds a short distance into the other tunnel branch, whereby said vehicle is guided into one tunnel branch by extending some of said guide plates to a vertical position that slide into one of said guide slots that follow the specified tunnel branch, and said guide plates are retracted after normal lateral guidance control is resumed and after said guide slot terminates.

12. A rapid transit system as set forth in claim 1 wherein said vacuum tunnel is rigidly mounted within an outer tunnel having greater diameter, and further comprising:
- a plurality of stand-off rods that support the inner vacuum tunnel away from the walls of the outer tunnel;
- means for aligning the vacuum tunnel within the outer tunnel by adjusting the effective lengths of said stand-off rods;
- laser beam means for continuously monitoring the alignment of the vacuum tunnel by an alignment monitoring system inside the tunnel; and
- a plurality of sensor means for each laser beam means for transmitting the laser beam therethrough when in alignment and at least partly intercepting the laser beam when not in alignment; and wherein the means for evacuating comprises means for evacuating and maintaining the inner tunnel at high vacuum.

13. A system as set forth in claim 12 wherein the inner vacuum tunnel has a circular cross section and further comprising:
- support partition means extending longitudinally along the tunnel essentially through its horizontal diameter;
- each of the two resulting corridors comprising an independent plurality of levitating magnetic rails, a lateral guidance rail and skid rails adjacent the bottom thereof so that vehicles can move independently of each other through each corridor in opposite directions at the same time.

14. A rapid transit system as set forth in claim 13 wherein each of said vehicles moving on upper level and lower level vacuum tunnel corridors is equipped with an escape system means by which passengers stranded between stations in a disabled vehicle can be safely rescued from it without having to pressurize the tunnel or without having to tow the train to the next station, said means comprising:
- a plurality of air-tight escape hatches mounted on the floor of each upper level vehicle and on the ceiling of each lower level vehicle and spaced apart so that when a lower level vehicle is directly below an upper level vehicle, the escape hatches on each side of the partition in each vehicle are opposite each other and not obstructed by any guidance, reaction, levitating or skid rails;
- a retractable, flexible tube mounted around each escape hatch for manual extension to engage and completely surround an opposite excape hatch to form an air-lock;
- means for allowing vehicle air into said air-lock for pressurizing it to atmospheric pressure; and
- means for opening each escape hatch after the air-lock is pressurized from either vehicle so that passengers can be evacuated, whereby every upper level vehicle can be used to rescue passengers stranded in a disabled lower level vehicle and every lower level vehicle can be used to rescue passengers stranded in a disabled upper level vehicle anywhere in the tunnel.

15. A rapid transit system as set forth in claim 1 wherein said means for allowing passengers to pass between said vehicle's interior and station without removing the vehicle from the hard vacuum environment of the tunnel comprises:
- a train of detachably coupled cars having pressure-tight doors;
- means for coupling each car in the train so that a nearly constant car separation distance is maintained under compression or tension forces;
- a plurality of pressure-tight doors built into the tunnel walls at each station with equal separation distance such that when a train stops at a predetermined location in the station, all the car doors are opposite station doors;
- air-tight retractable flanges built into the tunnel walls that surround each tunnel door for surrounding and engaging each car door, whereby the region bounded by the flanges, car door and tunnel door forms an air-lock;
- means for pressurizing the air-lock to atmospheric pressure;
- means for opening the car door and tunnel wall door after the air-lock has been pressurized to atmospheric pressure, allowing passenger transfer; and
- means for closing the car door and tunnel door and evacuating the air-lock before retracting said flanges.

16. A rapid transit system as set forth in claim 15 wherein said means for evacuating the air-locks comprising vacuum pumps located in each station and large vacuum tanks maintained in a vacuum approximately 1,000 times higher than that of the tunnel for emptying the residue air not removed by the vacuum pumps.

17. A system as set forth in claim 15 further comprising;
- a plurality of positioning arms that flip out from the tunnel at each station slightly ahead and slightly to the rear of each individual car in the train for accurately positioning each car in said train stopped at a station so that all its doors are correctly positioned horizontally from all of the tunnel wall doors;
- means on said positioning arms for serving as electrical connections to each car of the train to conduct electrical power; and
- means for mechanically lifting the entire train slightly so that all the doors are precisely opposite the tunnel wall doors and kept stationary.

18. A system as set forth in claim 1 wherein the vehicle comprises a train of detachable coupled cars, each car capable of operating individually or as a train of several coupled cars.

19. A rapid transit system as set forth in claim 1 wherein the vehicle comprises a train of detachably coupled cars; and further comprising
- flywheel alternator-motor energy storage units on each car for supplying electrical power needed to operate all systems in the car while it is moving between stations;
- means on each car for receiving electrical power to recharge said flywheel energy storage units from each station; and
- umbilical lines that connect adjacent cars so that electrical current and pressurized air could be circulated throughout the entire train or concentrated to a particular car if needed.

20. A method of operating a rapid transit system having an underground tunnel extending between a pair of stations comprising the steps of:
- maintaining a hard vacuum in the tunnel;
- suspending the weight of a vehicle in the tunnel by permanent magnet repulsive levitation; magnetically stabilizing the vehicle laterally in the tunnel with frictionless permanent magnets so that no portion of the vehicle physically contacts any portion of the tunnel;
- gravitationally accelerating the suspended vehicle down a descending portion of the tunnel whereby substantially all of the vehicle's gravitational potential energy is converted to vehicle kinetic energy; and
- gravitationally decelerating the vehicle in an ascending portion of the tunnel whereby substantially all of the vehicle's kinetic energy is converted to gravitational potential energy.

21. A method of operating a rapid transit system as defined in claim 20 wherein said accelerating and decelerating steps comprise moving the vehicle along an underground tunnel that follows a continuous smooth curve lying essentially in the vertical plane passing through the stations.

22. A method of operating a rapid transit system as defined in claim 20 wherein said accelerating and decelerating steps comprise moving the vehicle along an underground tunnel that has two continuously curving arcs sloping downwardly from each station separated by a straight horizontal section located at the maximum depth such that the entire path lies essentially in the vertical plane passing through the stations.

23. A method of operating a rapid transit system as defined in claim 20 further comprising the steps of:
- starting the vehicle at a station by linear motors using energy stored on-board the vehicle;
- braking the vehicle at another station by linear generators; and
- storing the energy from the regenerative braking on-board the vehicle.

24. A method of operating a rapid transit system as defined in claim 23 further comprising:
- braking the vehicle with regenerative brakes; and
- storing the regenerative braking energy in said energy storage means.

25. A method of operating a rapid transit system as defined in claim 23 wherein said auxiliary propulsion and braking steps are used to increase vehicle speed, the added energy being recovered by regenerative braking.

26. A method of operating a rapid transit system as defined in claim 20 further comprising:
- establishing an air-tight passage between a station and the interior of the vehicle when stopped at the station without removing the vehicle from the vacuum of the tunnel.

27. A method of operating a rapid transit system as defined in claim 26 further comprising the step of accurately positioning and holding said vehicle so that it is properly positioned for said air-tight passageways.

28. A method of operating a rapid transit system as defined in claim 20 further comprising converting excess vehicle kinetic energy to flywheel inertial energy by regenerative braking at a relatively lower elevation station; and converting flywheel inertial energy into additional vehicle kinetic energy by auxiliary propulsion means so that it can climb to a higher station elevation having higher gravitational potential energy.

29. A method of operating a rapid transit system as defined in claim 20 wherein the tunnel is divided into an upper semi-circular passage and a lower semi-circular passage comprising the additional step of:

moving vehicles through the upper and lower passages in opposite directions, said vehicles moving independently of each other.

30. A method of operating a rapid transit system as defined in claim 20 further comprising the step of applying magnetic repulsive forces laterally relative to the vehicle's length for lateral stabilization of the vehicle in a predetermined position relative to the repulsive levitating magnets.

31. A method of operating a rapid transit system as defined in claim 20 further comprising the step of tunnel switching by engaging a guide slot in the immediate vicinity of a tunnel intersection by retractable guide plates on-board the vehicle.

32. A method of operating a rapid transit system as defined in claim 20 further comprising regenerative decelerating the vehicle as it approaches each station so that it comes to a stop at a predetermined point.

* * * * *

UNITED STATES PATENT AND TRADEMARK OFFICE
CERTIFICATE OF CORRECTION

PATENT NO. : 3,954,064  
DATED : May 4, 1976  
INVENTOR(S) : Michael A. Minovitch Page 1 of 2

It is certified that error appears in the above-identified patent and that said Letters Patent are hereby corrected as shown below:

Column 3, Line 25, "virtully" should be -- virtually --.

Column 4, line 42, should be $V = \sqrt{2gy}$

Column 5, line 5, should be
$$d = \frac{D}{2} \tan\left(\frac{\theta_0}{2}\right)$$

Column 5, line 10, should be
$$T = \pi \sqrt{\frac{D}{2g \sin\theta_0}} \left[1 + \frac{1}{4} \sin^2\left(\frac{\theta_0}{2}\right)\right]$$

Column 5, line 65, should be
$$a = \left(\frac{8 \sin\theta_0}{\pi^2}\right) g$$

Column 6, line 35, should be
$$T = \frac{2\sqrt{2gd}}{g \sin\theta_0} + \frac{D \tan\theta_0 - 2d}{\sqrt{2gd} \tan\theta_0}$$

Column 6, line 55, should be
$$T_{min} = \sqrt{\frac{2\pi D}{g}}$$

Column 6, line 67, should be $(0 \leq y \leq D/\pi)$

Column 7, line 1, should be
$$a_n = 2g\sqrt{\frac{y\pi}{D}}$$

UNITED STATES PATENT AND TRADEMARK OFFICE
CERTIFICATE OF CORRECTION

PATENT NO. : 3,954,064
DATED : May 4, 1976
INVENTOR(S) : Michael A. Minovitch

It is certified that error appears in the above-identified patent and that said Letters Patent are hereby corrected as shown below:

Column 9, Line 16, "te" should be -- the --.

Column 14, line 58, -- car -- should be inserted between "each" and "door".

Column 17, line 66, "An" should be -- As --.

Column 19, line 43, -- as -- should be inserted after "vehicle" and before "in".

Column 21, line 28, "accidential" should be -- accidental --.

Signed and Sealed this

Twenty-fourth Day of August 1976

[SEAL]

Attest:

RUTH C. MASON
Attesting Officer

C. MARSHALL DANN
Commissioner of Patents and Trademarks